340-870.11 SR
XR 3,696,383

United States Patent [15] 3,696,383

Oishi et al. [45] Oct. 3, 1972

[54] INFORMATION TRANSMISSION SYSTEM FOR METERED MAGNITUDES

[72] Inventors: Hiroshi Oishi; Fumio Aoki, both of Yokohama; Shigeru Kawano, Ibaraki; Hitoshi Muramatsu, Kawasaki; Masahiro Saeki, Sagamihara, all of Japan

[73] Assignee: Tokyo Electric Power Company and Fujitsu Limited, Tokyo, Kawasaki, Japan

[22] Filed: Dec. 31, 1970

[21] Appl. No.: 103,221

[30] Foreign Application Priority Data

Jan. 17, 1970 Japan ........................45/4517

[52] U.S. Cl. ..................340/310, 340/151, 340/182, 340/204

[51] Int. Cl. ..........................................H04m 11/04

[58] Field of Search......340/310, 151, 182, 183, 204, 340/170

[56] References Cited

UNITED STATES PATENTS 3,461,428 8/1969 Anderson ..................340/310
3,508,243 4/1970 Nyfeler et al. .............340/310
3,483,546 12/1969 Ausfeld .....................340/310
3,416,075 12/1968 Rutenberg.................340/183
2,378,326 6/1945 Rees et al. .................340/170
3,287,722 11/1966 Craig.........................340/310

*Primary Examiner*—John W. Caldwell
*Assistant Examiner*—Robert J. Mooney
*Attorney*—Curt M. Avery, Arthur E. Wilfond, Herbert L. Lerner and Daniel J. Tick

[57] ABSTRACT

ON and OFF information signals are transmitted through an AC voltage distribution line via a single frequency carrier signal during a period of time in each cycle of the AC voltage when the information signal is in the ON condition and during another period of time in each such cycle when the information signal is in the OFF condition. A receiver receives the carrier signal from the distribution line synchronously with the AC voltage and determines the ON and OFF condition of the derived and received signal.

2 Claims, 7 Drawing Figures

CHECKING CIRCUIT

INFORMATION TRANSMISSION SYSTEM FOR METERED MAGNITUDES

DESCRIPTION OF THE INVENTION

The invention relates to an information transmission system. More particularly, the invention relates to an information transmission system for metered magnitudes. The information transmission system of the invention transmits informations such as magnitudes metered by meters or the condition of apparatus located at a single place or a plurality of places.

Information in remote localities may generally be collected by information transmission equipment or by personnel who visit such localities. In the conventional system in which there is a considerably large magnitude of information, and it is required to transmit the information, information transmission equipment is generally provided. Where there is only a small magnitude of information, however, it is disadvantageous from an economic point of view to provide transmission equipment. In such a situation, the information must be collected by personnel who visit the various localities. An example of a system in which personnel visit the various localities, is the inspection of energy or power meters in each home or house. In this case, a small magnitude of information, scattered in numerous localities, must be collected, and it is therefore disadvantageous from the economic point of view to use conventional signal transmission equipment. For this reason, energy or power meters have previously been inspected by inspectors who visit each house or home. The disadvantage of such an arrangement is that many inspectors are required and considerable time is consumed in the inspection of meters.

The information transmission system of the invention eliminates the aforedescribed disadvantages and is capable of transmitting a small magnitude of information. The system of the invention is less expensive than a conventional system.

The principal object of the invention is to provide a new and improved information transmission system for metered magnitudes.

An object of the invention is to provide an information transmission system for transmitting a small magnitude of information, which system is less expensive than a conventional system.

An object of the invention is to provide an information transmission system which functions with efficiency, effectiveness and reliability.

In accordance with the invention, an information transmission system for transmitting ON and OFF information signals through an AC voltage distribution line comprises transmission means including switch means for transmitting a single frequency carrier signal to the distribution line via the switch means. The switch means is controlled in ON and OFF operation in accordance with an ON and OFF information signal during a period of time in each cycle of the AC voltage when the information signal is in the ON condition and during another period of time in each such cycle when the information signal is in the OFF condition. Receiving means derives and receives the carrier signal from the distribution line synchronously with the AC voltage. The receiving means includes discriminating means for determining the ON and OFF condition of the derived and received signal.

The information signals correspond to metered magnitudes and the transmission means includes meter means for providing an output signal each time a unit of the metered magnitude is metered at the transmission means. The receiving means includes counting means for counting the number of received signals.

The transmission means comprises a plurality of transmitters. The receiving means comprises a receiver having an input and scanning means interposed between the transmitters and the input of the receiver for scanning the transmitters at a time interval shorter than the shortest pulse length of the information signals whereby the receiver receives information signals from all the transmitters.

In order that the invention may be readily carried into effect, it will now be described with reference to the accompanying drawings, wherein.

In the figures, the same components are identified by the same reference numerals.

In the information transmission system of the invention, information is transmitted by representation of the ON or OFF condition of switches or contacts, or the presence or absence of pulses such as, for example, digital "1" and "0" signals. Therefore, for example, when the information indicates the operating condition of apparatus, "1" is transmitted when the apparatus is in its operating condition and "0" is transmitted when the apparatus is in its non-operating condition. When a measured magnitude is transmitted as the information, a "1" signal is transmitted from the transmitter each time a unit of the measured magnitude is measured. At the receiver, the number of received "1" signals is counted. Otherwise, the number of "1" signals is counted at the transmitter and such number is coded and transmitted to the receiver.

Figure 1:
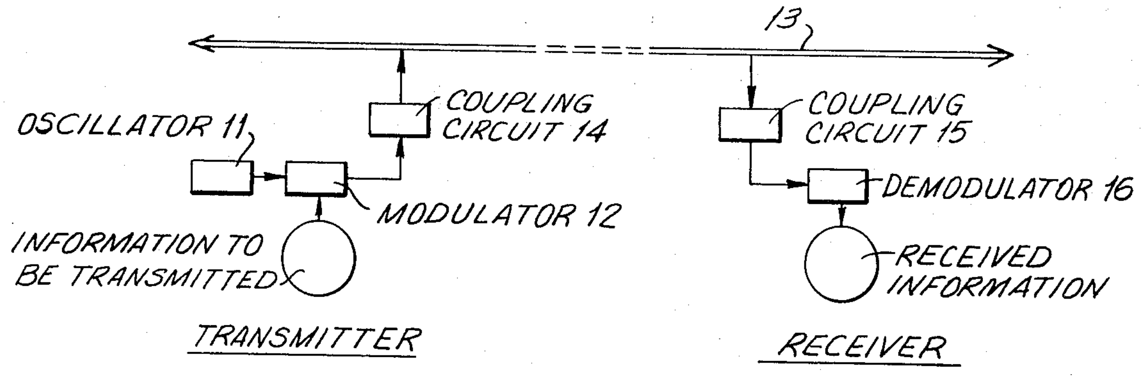
FIG. 1 PRIOR ART
FIG. 1 is a schematic block diagram of a conventional information transmission system.

FIG. 1 illustrates a conventional transmission system for transmitting "1" and "0" signals via transmission lines. In the system of FIG. 1, the transmitter includes an oscillator 11 of a specific frequency. The oscillation frequency of the oscillator 11 is modulated by a modulator 12 having an input connected to the output of the oscillator. The oscillation frequency of the oscillator 11 is modulated by the modulator 12 in accordance with whether information to be transmitted constitutes a "1" signal or a "0" signal. Signals are transferred to transmission lines 13 via a coupling circuit 14 having an input connected to the output of the modulator 12 and an output connected to said transmission line.

At the receiver, the signals are derived from the transmission line 13 via a coupling circuit 15 having an input connected to said transmission line and an output connected to a demodulator 16. The demodulator 16 demodulates the received signals into "1" and "0" signals, wherefrom the received information is derived.

The conventional transmission system shown in FIG. 1 may be classified in three systems. In a first system, the oscillator 11 is a single frequency oscillator and its output is transferred interruptedly via the modulator 12, in accordance with whether the information to be transmitted is "1" or "0." This is the simplest system, although errors caused by noise cannot be checked at the receiver. Furthermore, this system cannot eliminate the influence of the signal level variation which occurs when low quality communication lines, such as distribution lines, are utilized as the transmission lines.

A second system utilizes more than two oscillators 11. In the second system, more than two frequencies are transmitted simultaneously to eliminate the disadvantage of the first system. The second system is able to reduce the reception errors caused by noise, but cannot eliminate the influence due to signal level variation. The second system is also deficient, since more than two transmitters and a plurality of occupied frequency bands are required.

A third system utilizes a frequency shift modulation system to eliminate the disadvantages of the first system and the second system. The third system switches the transmission frequencies in accordance with whether the information is "1" or "0." The third system is able to reduce the reception errors and is able to eliminate the influence of the signal level variation by utilizing automatic gain control. The third system, however, as does the second system, has the disadvantage that the occupied frequency band is large compared with the single frequency. Furthermore, the utilization of a stable oscillator makes the third system expensive.

Figure 2:
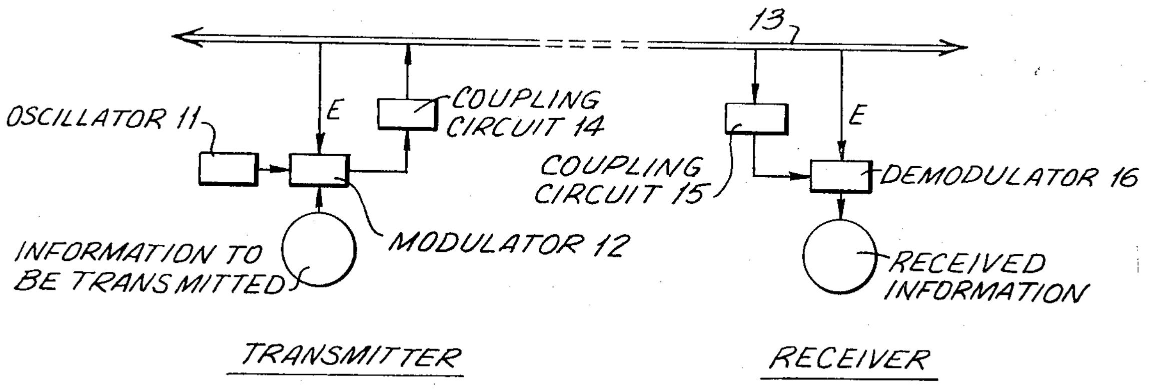
FIG. 2 is a schematic block diagram of an embodiment of the information transmission system of the invention.

The aforedescribed disadvantages of the conventional information transmission system are eliminated by the information transmission system of the invention, as illustrated in FIG. 2. The components of the information transmission system of FIG. 2 are the same as the components of the information transmission system of FIG. 1 and are therefore identified by the same reference numerals. The difference between the information transmission system of the invention and the known type of information transmission system is the utilization of a superimposed AC voltage E in the transmission lines 13.

In FIG. 2, the transmitter comprises the oscillator 11 of a single frequency and the modulator 12 and the coupling circuit 14 which connects said oscillator to the transmission lines 13. The information to be transmitted is applied to one input of the modulator 12 and an AC voltage E, superimposed on the transmission lines 13, is applied to another input of said modulator. The modulator 12 provides a modulation output corresponding to the input information in synchronism with the phase of the input AC voltage E.

The demodulator 16 of the receiver has one input connected to the transmission lines 13 via the coupling circuit 15. The received signals are supplied to the demodulator 16 via the coupling circuit 15. The AC voltage E, superimposed on the transmission lines 13, is applied to another input of the demodulator 16. The demodulator 16 demodulates the received signals in synchronism with the phase of the input AC voltage E. The demodulated output of the demodulator 16 is the received information.

Figure 3:
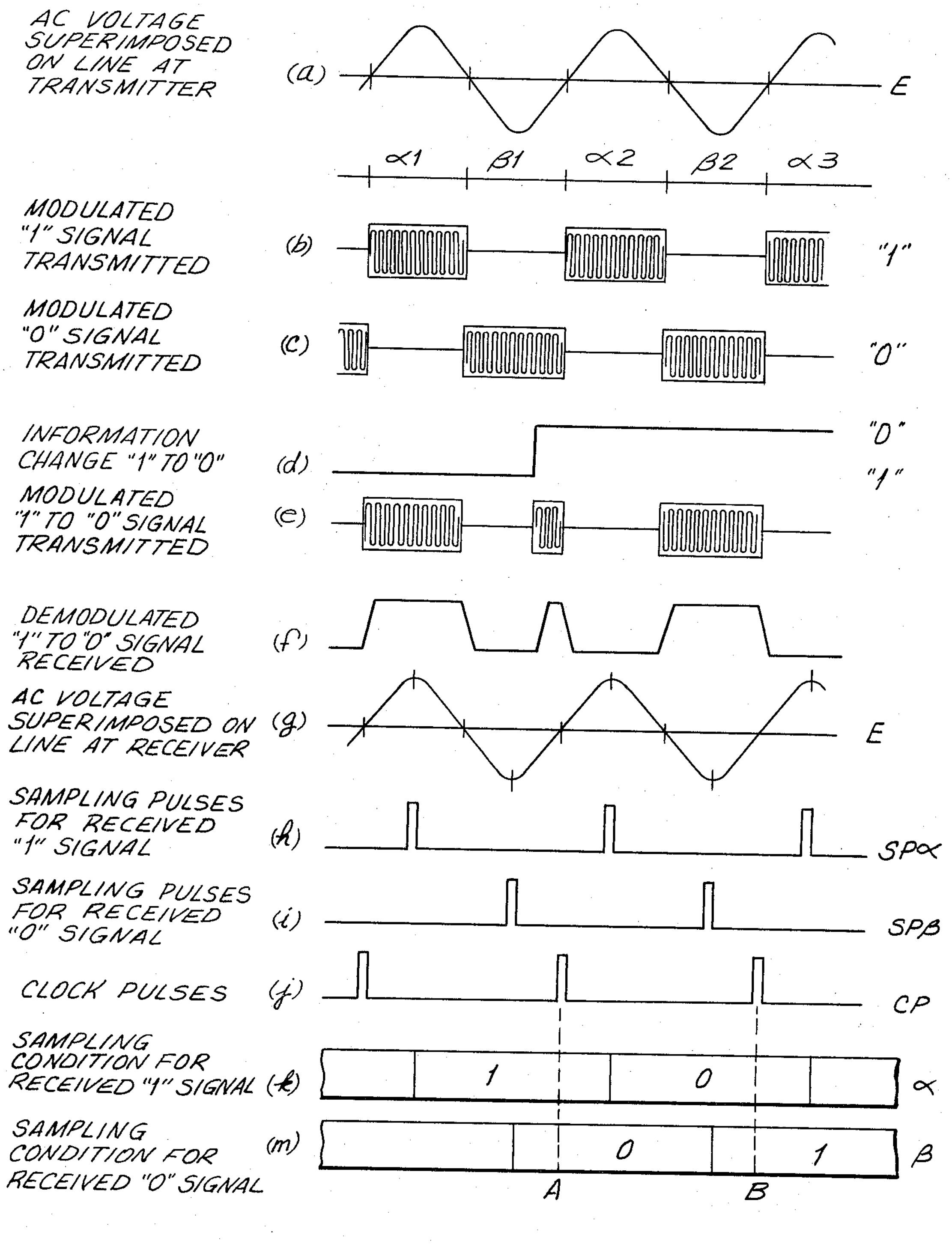
FIG. 3 is a graphical presentation of a plurality of waveforms appearing in the information transmission system of FIG. 2.

FIG. 3 illustrates the details of the practical modulation and demodulation described with reference to FIG. 2. FIG. 3*a* illustrates the AC voltage E superimposed on the transmission lines 13 at the transmitter. In order to enhance the clarity of illustration, the phases of the cycles are illustrated as $\alpha 1, \beta 1, \alpha 2, \beta 2, \alpha 3, \beta 3, \ldots \alpha i, \beta i$.

When the input information to be transmitted is "1," the modulator 12 transfers the signal of the oscillator 11 to the coupling circuit 14 in the $\alpha$ $\beta$ phase, and not in the $\beta$ phase. When the information to be transmitted is "0," the signal is transferred in the $\beta$ phase, and not in the $\alpha$ phase. When the input information is "1,"the modulator 12 produces a modulated output as shown in FIG. 3*b*. When the input information is "0," the modulator 12 produces a modulated output as shown in FIG. 3*C*.

The aforedescribed modulation is only an example of the modulation. Various other arrangements for dividing a cycle into "1" and "0" signals may be utilized.

FIG. 3*d* illustrates the situation in which the input information is changed from "1" to "0." In this case, the modulator 12 produces a modulated output shown in FIG. 3*e*, if the aforedescribed modulation arrangement is utilized.

The detected and rectified signals received by the receiver are illustrated in FIG. *f*. FIG. 3*f* indicates the detected and rectified signal of FIG. 3*e*. The AC voltage E superimposed on the lines 13 at the receiver is illustrated in FIG. 3*g*.

At the receiver, the output signal illustrated in FIG. 3*f*, provided by the demodulator 16, is demodulated synchronously with the AC voltage illustrated in FIG. 3*g*. Thus, sampling pulses SP$\alpha$ are provided for the $\alpha$ phase, as illustrated in FIG. 3*h*, and sampling pulses SP$\beta$ are provided for the $\beta$ phase, as illustrated in FIG. 3*i*, as derived from the AC voltage E, illustrated in FIG. 3*g*. The demodulated output illustrated in FIG. 3*f* is thus sampled.

FIG. 3*j* illustrates the clock pulses CP. FIG. 3*k* illustrates the condition of sampling by the sampling pulses SP$\alpha$. FIG. 3*m* illustrates the condition of sampling by sampling pulses SP$\beta$. It may be determined whether the information transmitted is "1" or "0" by checking the conditions of FIGS. 3*k* and 3*m* in correspondence with the clock pulses of FIG. 3*j*. At an instant A of a clock pulse CP, the $\alpha$ phase output is "1" and the $\beta$ phase output is "0," so that it may be determined that the information of the first cycle is "1." At an instant B of another clock pulse CP, the $\alpha$ phase output is "0" and the $\beta$ phase output is "1," so that it may be determined that the information of the second cycle is "0."

Figure 4:
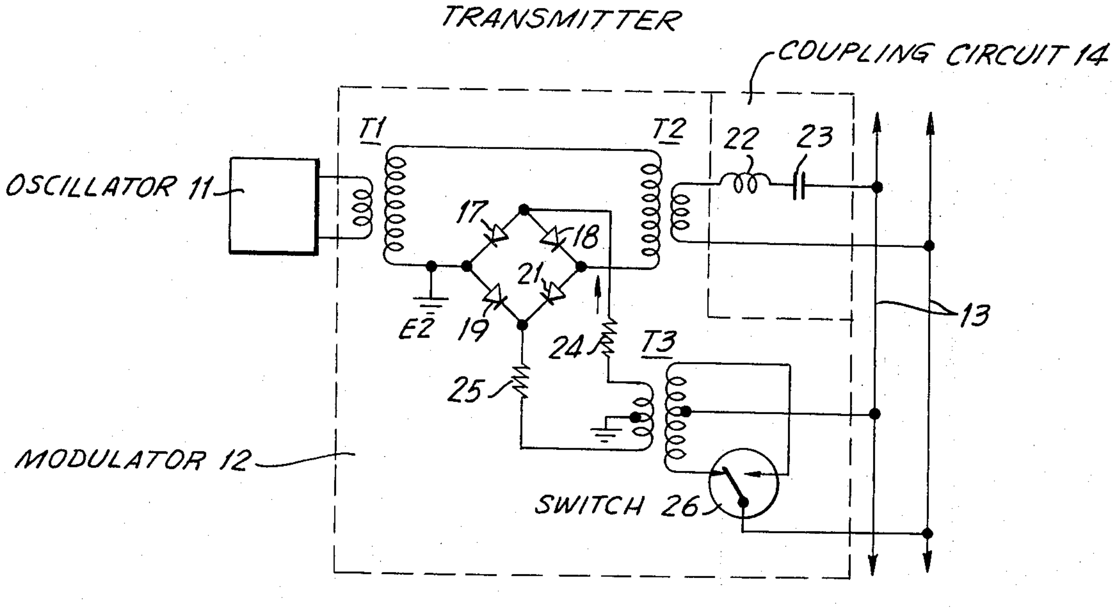
FIG. 4 is a circuit diagram of an embodiment of the transmitter of the information transmission system of FIG. 2.

FIG. 4 is an embodiment of the transmitter of the information transmission system of the invention, as shown in FIG. 2. In FIG. 4, the oscillator 11 is of a specific frequency and its output is connected to the primary winding of a transformer T1 of the modulator 12. The secondary winding of the transformer T1 of the modulator 12 is connected to the primary winding of a transformer T2 of said modulator. The circuit connecting the secondary winding of the transformer T1 to the primary winding of the transformer T2 includes a gate circuit having a plurality of diodes 17, 18, 19 and 21.

When the gate circuit 17, 18, 19, 21 is in its conductive condition, the output of the oscillator 11 is transferred to the transformer T2 and signals are transferred to the transmission lines 13 via the coupling circuit 14. The coupling circuit 14 comprises an inductor 22 and a capacitor 23. The diode gate circuit 17, 18, 19, 21 is switched to its condudtive condition when the diodes are biased in the forward direction and is switched to its non-conductive condition when the diodes are biased in the reverse direction.

The diodes 17, 18, 19 and 21 of the diode gate circuit 17, 18, 19, 21 are controlled by the voltage of the secondary winding of a transformer T3. The transmission lines 13 are connected to the primary winding of the transformer T3 of the modulator 12 and the AC voltage E superimposed on said transmission lines is supplied to said transformer. One end of the secondary winding of the transformer T3 is connected to an input terminal of the gate circuit 17, 18, 19, 21 via a current limiting resistor 24 and the other end of said secondary winding is connected to another input of said gate circuit via another current limiting resistor 25.

The primary winding of the transformer T3 is connected to a switch 26 which is controlled by a transmission information device of the type shown in FIG. 2 as indicating the information to be transmitted. Such a device is not shown in FIG. 4. The phase of the AC voltage E applied to the transformer T3 may thus be inverted by the switching of the transmission information device from ON to OFF, or from "1" to "0," or vice versa. Thus, since the phase of the current flowing to the diode gate circuit 17, 18, 19, 21 is inverted by the operation of the switch 26 of the modulator 12, the phase of transmission of the output of the oscillator 11 to the transmission lines 13 may be arbitrarily controlled by said switch.

As evident from the aforedescribed operation, the phase of transmission signals transferred to the transmission lines 13 is changed when the switch 26 of the modulator 12 is switched in operation, in accordance with whether the input information to be transmitted is "1" or "0." The receiver may thus detect this and thereby determine the information "1" or "0."

Figure 5:
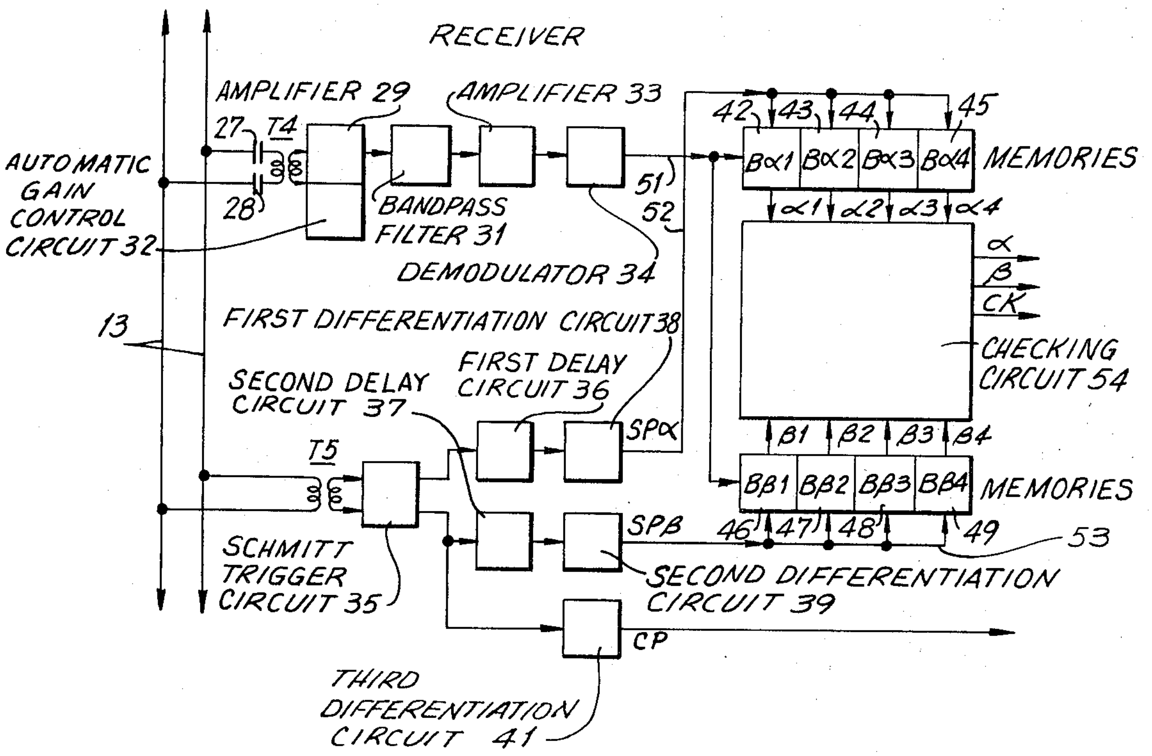
FIG. 5 is a block diagram of an embodiment of the receiver of the information transmission system of FIG. 2.

FIG. 5 is a block diagram of a receiver of the information transmission system of the invention, as shown in FIG. 2. The receiver of FIG. 5 receives the signals transmitted by the transmitter of FIG. 4. In FIG. 5, signals are transferred from the transmission lines 13 through a coupling capacitor 27 and a coupling capacitor 28 to the primary winding of a transformer T4. The secondary winding of the transformer T4 is connected to the input of an amplifier 29. The output of the amplifier 29 is connected to the input of a bandpass filter 31 which is tuned to the oscillation frequency of the transmitter. It is effective to include an automatic gain control circuit 32 with the amplifier 29.

The output of the bandpass filter 31 is connected to the input of an amplifier 33. The output of the amplifier 33 is connected to the input of a detector or demodulator 34. The input signal of the demodulator 34 is shown in FIG. 3*e* and the output signal of said demodulator is shown in FIG. 3*f*.

The AC voltage E superimposed on the transmission lines 13 is applied to the input of a Schmitt trigger circuit 35 via a transformer T5. The Schmitt trigger circuit 35 converts the AC voltage E into a rectangular wave. The output and the opposite phase output of the Schmitt trigger circuit 35 are delayed by a period of time equal to one-quarter of the period of the AC voltage E by a first delay circuit 36 and a second delay circuit 37. Thus, one output of the Schmitt trigger circuit 35 is connected to the input of the first delay circuit 36 and the other output of said Schmitt trigger circuit is connected to the input of the second delay circuit 37.

The output of the first delay circuit 36 is connected to the input of a first differentiation circuit 38. The output of the second delay circuit 37 is connected to the input of a second differentiation circuit 39. The second or opposite phase output of the Schmitt trigger 35 is also connected to the input of a third differentiation circuit 41 which provides the clock pulses CP. One clock pulse CP is produced in each period of the AC voltage E. The outputs produced by the first and second differentiation circuits 38 and 39 are the sampling pulses $SP\alpha$ for the $\alpha$ phase and $SP\beta$ for the $\beta$ phase of the AC voltage E. FIGS. 3*h*, 3*i* and 3*j* illustrate the sampling pulses $SP\alpha$, $SP\beta$ and the clock pulses CP, and the relation between the phases of said pulses.

In FIG. 5, a plurality of memories 42, 43, 44 and 45 store the $\alpha$ phase outputs $B\alpha1$, $B\alpha2$, $B\alpha3$ and $B\alpha4$. A plurality of memories 46, 47, 48 and 49 store the $\beta$ phase outputs $B\beta1$, $B\beta2$, $B\beta3$ and $B\beta4$. FIG. 5 indicates that each of the $\alpha$ and $\beta$ phases has four memories, since in the embodiment of FIG. 5, checking is provided of four times continuously received signals. Each of the memories 42, 43, 44 and 45 and 46, 47, 48 and 49 may memorize four bits. The memories 42, 43, 44 and 45 are interconnected as a shift register and the memories 46, 47, 48 and 49 are interconnected as a shift register. The output of the demodulator 34 is connected to a signal input line 51 and the sampling pulses $SP\alpha$ are supplied to a shift pulse input line 52, and the sampling pulses $SP\beta$ are supplied to a shift pulse input line 53. The output of the demodulator 34 is thus sampled by a sampling pulse $SP\alpha$ or $SP\beta$ in each period of the AC voltage E of the transmission lines 13. The content of the memory 42 becomes "1" or "0" in accordance with whether the $\alpha$ phase output is "1" or "0." The content of the memory 46 becomes "1" or "0" in accordance with whether the $\beta$ phase output is "1" or "0."

The content of each of the memories 42 and 46 is shifted to the right in FIG. 5, in the next period of the AC voltage E, and so on. The contents of the memories 42, 43, 44 and 45 and the memories 46, 47, 48 and 49 therefore always indicate the received output conditions of the four periods immediately preceding the stored memories.

A checking circuit 54 is included in the receiver of FIG. 5. The contents $\alpha1$, $\alpha2$, $\alpha3$ and $\alpha4$ of the memories 42, 43, 44 and 45 and the contents $\beta1$, $\beta2$, $\beta3$ and $\beta4$ of the memories 46, 47, 48 and 49 are supplied to corresponding inputs of the checking circuit 54 of FIG. 5.

Figure 6:
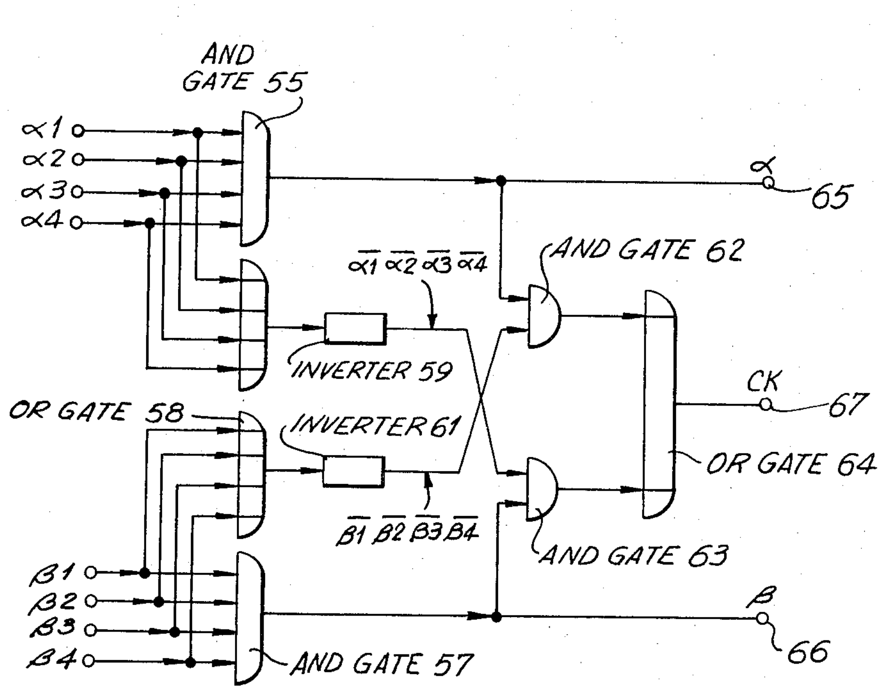
FIG. 6 is a block diagram of an embodiment of the checking circuit of FIG. 5.

FIG. 6 illustrates a checking circuit which may be utilized as the checking circuit 54 of FIG. 5. In FIG. 6, the outputs $\alpha1$, $\alpha2$, $\alpha3$ and $\alpha4$ from the memories 42, 43, 44 and 45 of FIG. 5 are supplied to the first input of an AND gate 55 and an OR gate 56, the second input of said AND gate and said OR gate, the third input of said AND gate and said OR gate and the fourth input of said AND gate and said OR gate, respectively. The outputs $\beta1$, $\beta2$, $\beta3$ and $\beta4$ of the memories 46, 47, 48 and 49 are supplied to the first input of an AND gate 57 and an OR gate 58, the second input of said AND gate and said OR gate, the third input of said AND gate and said OR gate, and the fourth input of said AND gate and said OR gate, respectively. The output of the OR gate 56 is connected to the input of an inverter 59. The output of the OR gate 58 is connected to the input of an inverter 61.

The output of the AND gate 55 is connected to the first input of an AND gate 62. The output of the inverter 61 is connected to the second input of the AND gate 62. The output of the AND gate 57 is connected to the first input of an AND gate 63. The output of the inverter 59 is connected to the second input of the AND gate 63. The output of the AND gate 62 is connected to the first input of an OR gate 64. The output of the AND gate 63 is connected to the second input of the OR gate 64. The AND gate 55 produces an output $\alpha$ at an output terminal 65. The AND gate 57 produces an output $\beta$ at an output terminal 66. The OR gate 64 produces an output CK at an output terminal 67.

The outputs $\alpha$, $\beta$ and CK may be expressed as $$\alpha = \alpha1\ \alpha2\ \alpha3\ \alpha4$$

$$\beta = \beta1\ \beta2\ \beta3\ \beta4$$

$$CK = \alpha\,(\overline{\beta1}\ \overline{\beta2}\ \overline{\beta3}\ \overline{\beta4}) + (\overline{\alpha1}\ \overline{\alpha2}\ \overline{\alpha3}\ \overline{\alpha4})\,\beta$$

These signals are supplied to a central processor unit, such as a computer, not shown in the FIGS., and are processed in such central processor unit. If the output signal CK is "1," it indicates that the information did not change during the four cycles in the checking of four times continuously received signals. In this case, if $\alpha$ is "1" and $\beta$ is "0," it is determined that the information is "1." If $\alpha$ is "0" and $\beta$ is "1," it is determined that the information is "0." If, on the other hand, the output signal CK is "0," it indicates that the information varied, changed or was disturbed by noise from the outside, during the four times continuously received signals, and therefore in such case, the received information is not creditable.

In an embodiment of the information system of the invention in which checking of four times continuous transmission is provided, correct information variation cannot be known within a time delay of at least four cycles. In the case of transmission, however, for example, of information concerning water levels or consumed electric power or information from water meters or gas meters wherein there is little information variation compared with the frequency of the AC voltage superimposed on the distribution lines, the aforedescribed time delay is not problematical, and since the checking is performed four times, the acceptable received information has a high reliability.

An embodiment of the information transmission system of the invention may be constructed comprising a plurality of transmitters and a single receiver. Information from the transmitters may be received by the receiver in accordance with the principle of time division. Such an embodiment of the information transmission system of the invention is inexpensive. The receiver receives the information transmitted from all the transmitters, if said receiver scans all the transmitters in a time slot shorter than the shortest duration of the "1" or "0" signals transmitted from said transmitters.

Figure 7:
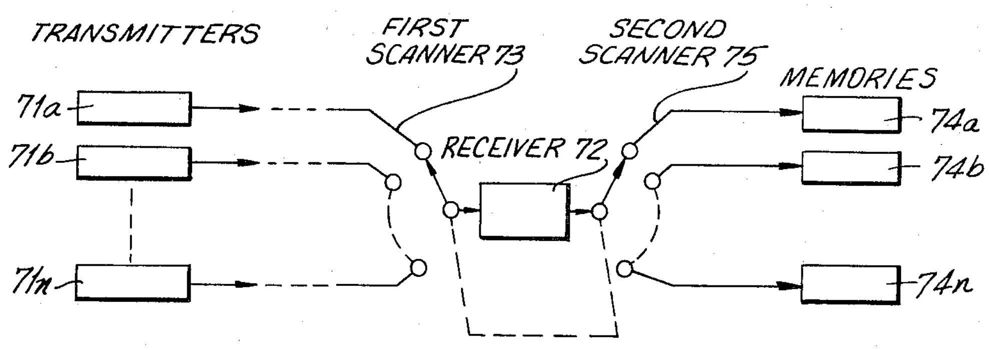
FIG. 7 is a block diagram of another embodiment of the information transmission system of the invention.

FIG. 7 illustrates a time division information transmission system of the aforedescribed type. In FIG. 7, *n* transmitters 71*a*, 71*b*, ... 71n are included in the system. The transmitters 71*a* to 71*n* are connected to the input of a receiver 72 via a first scanner 73. The first scanner 73 scans the transmitters 71*a* to 71*n* at a period shorter than the shortest duration of the information signals "1" or "0" transmitted from said transmitters.

The output of the receiver 72 is connected to *n* memories 74*a*, 74*b*, ... 74*n* via a second scanner 75. The second scanner 75 operates in synchronism with the first scanner 73, so that the signals transmitted by the transmitters 71*a* to 71*n* are received by the receiver 72 and the output of said receiver is transferred to the information memories 74*a* to 74*n*, each of which corresponds with a corresponding one of said transmitters. All the information transmitted may thus always be transferred to the receiver 72.

As hereinbefore described, in the information transmission system of the invention, only a single oscillator of a single frequency is required at the transmitter, and the modulator of the transmitter is of extremely simple structure, so that the system is inexpensive. When the modulation arrangement illustrated in FIGS. 3*b* and 3*c* is utilized, for example, the received signals may be checked by utilizing the fact that when the information transmitted is "1," the output of the oscillator is transmitted only during the $\alpha$ phase and not during the $\beta$ phase, and when the information transmitted is "0," the output of the oscillator is transmitted only during the $\beta$ phase, and not during the $\alpha$ phase. In accordance with the invention, the reliability of transmission may be increased, since the information is received over more than two cycles, and the continuous transmission checking system is utilized.

Furthermore, in accordance with the invention, the input may always be adjusted to the optimum received signal level at the receiver by the utilization of an automatic gain control circuit by utilizing the fact that the output of the oscillator is always transmitted during a constant period of time in each of a plurality of cycles, and therefore an advantageous transmission system is provided. This may reduce the influence of signal level variation at the receiver when low quality lines, such as distribution lines, are utilized as the transmission lines.

Another characteristic of the invention is that when lines on which an AC voltage is superimposed are utilized as the transmission lines, the AC voltage may be utilized as the synchronizing signal without modification. Therefore, since ordinary distribution lines may be utilized for the signal transmission, a very inexpensive system may be constructed. The information transmission system of the invention has the advantage that when an AC voltage is not superimposed on the transmission lines, the aforedescribed object may be accomplished by applying an AC voltage to the transmission lines from the outside. The information transmission system of the invention may be applied, for example, to telemetering equipment or automatic meter inspection systems for automatically counting the metered magnitudes in energy or power meters provided in houses or homes, from a remote place, with good practical results.

While the invention has been described by means of specific examples and in specific embodiments, we do not wish to be limited thereto, for obvious modifications will occur to those skilled in the art without departing from the spirit and scope of the invention.

We claim:

1. A data transmission system for transmitting via two distribution lines a constant cycle signal varying in accordance with the data signal "1" and "0," superimposed on a half cycle AC voltage, said data transmission system comprising oscillator means generating a constant cycle signal;

first switching means having end terminals for transmitting the constant cycle signal from the oscillator to the distribution lines;

transformer means having a primary winding having two ends, an intermediate tap connected to one of the distribution lines and a secondary winding having ends connected to the end terminals of the first switching means; and second switching means having a switch arm which selectively connects one of the two ends of the primary winding of the transformer means to the other of the distribution lines in accordance with the data signal "1" and "0."

2. A data transmission system as claimed in claim 1, further comprising a bandpass filter coupled to the distribution lines and passing only the constant cycle signal of the oscillator superimposed on the half cycle AC voltage transmitted via the distribution lines, detector means connected to the bandpass filter for demodulating the constant cycle signal, and differentiation circuit means coupled to the distribution lines for generating sampling pulses for sampling the demodulated constant cycle signal superimposed on the half cycle AC voltage transmitted via the distribution lines.

* * * * *